US008078954B2

(12) United States Patent  
Cook et al.

(10) Patent No.: US 8,078,954 B2
(45) Date of Patent: Dec. 13, 2011

(54) SYSTEM AND METHOD FOR PAGE FLOW EDITOR

(75) Inventors: Thomas A. Cook, Boulder, CO (US); Troy Beecroft, Broomfield, CO (US); Thomas Carl Stamm, Louisville, CO (US); James Barnett, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1236 days.

(21) Appl. No.: 11/528,062

(22) Filed: Sep. 27, 2006

(65) Prior Publication Data

US 2007/0079286 A1    Apr. 5, 2007

Related U.S. Application Data

(60) Provisional application No. 60/721,148, filed on Sep. 27, 2005.

(51) Int. Cl.
*G06F 17/00* (2006.01)

(52) U.S. Cl. .................................. 715/210; 715/764

(58) Field of Classification Search ................ 717/132; 715/210, 764

See application file for complete search history.

(56) References Cited

U.S. PATENT DOCUMENTS

| | | | |
|---|---|---|---|
| 5,430,873 A * | 7/1995 | Abe et al. | 717/113 |
| 6,549,221 B1 * | 4/2003 | Brown et al. | 715/854 |
| 6,601,233 B1 | 7/2003 | Underwood | |
| 6,701,513 B1 * | 3/2004 | Bailey | 717/109 |
| 6,804,686 B1 * | 10/2004 | Stone et al. | 707/104.1 |
| 6,812,941 B1 * | 11/2004 | Brown et al. | 715/854 |
| 7,131,107 B2 * | 10/2006 | Wall et al. | 717/105 |
| 7,499,956 B1 | 3/2009 | Darcy et al. | |
| 2001/0007139 A1 * | 7/2001 | Murray | 714/26 |
| 2002/0032706 A1 * | 3/2002 | Perla et al. | 707/530 |
| 2002/0130907 A1 * | 9/2002 | Chi et al. | 345/853 |
| 2002/0138556 A1 * | 9/2002 | Smithline et al. | 709/203 |
| 2002/0184616 A1 * | 12/2002 | Chessell et al. | 717/132 |
| 2003/0004746 A1 | 1/2003 | Kheirolomoom et al. | |
| 2003/0023953 A1 * | 1/2003 | Lucassen et al. | 717/106 |
| 2003/0084120 A1 | 5/2003 | Egli | |
| 2003/0149722 A1 * | 8/2003 | Jolley et al. | 709/203 |
| 2004/0068568 A1 * | 4/2004 | Griffin et al. | 709/227 |
| 2004/0225995 A1 * | 11/2004 | Marvin et al. | 717/100 |
| 2005/0033717 A1 * | 2/2005 | Ellis et al. | 707/1 |
| 2005/0060685 A1 * | 3/2005 | Franz et al. | 717/109 |
| 2005/0114771 A1 * | 5/2005 | Piehler et al. | 715/536 |
| 2005/0138641 A1 * | 6/2005 | Kobylinski et al. | 719/318 |
| 2005/0182768 A1 * | 8/2005 | Waldorf et al. | 707/10 |

(Continued)

OTHER PUBLICATIONS

Novell, Inc., Novell Extend Director 5.2 Pageflow and Form Guide, Jun. 2004, Novell, Inc., pp. 1-180.*

(Continued)

*Primary Examiner* — Laurie Ries
*Assistant Examiner* — Frank D Mills
(74) *Attorney, Agent, or Firm* — Fliesler Meyer LLP

(57) ABSTRACT

The present invention enable a three-pane page flow editor optimized for viewing and editing a page flow. It centers around a selected focal node in the page flow, shows details and allows editing in the vicinity of the node. It provides a visual representation of nodes and the connections among them, enabling the ability to read and edit connections between nodes in a local area of the page flow without the overlaps between lines and crossovers once the page flow grows complex and cluttered in real applications. This description is not intended to be a complete description of, or limit the scope of, the invention. Other features, aspects, and objects of the invention can be obtained from a review of the specification, the figures, and the claims.

19 Claims, 6 Drawing Sheets

Control Module 208

U.S. PATENT DOCUMENTS

| | | | |
|---|---|---|---|
| 2005/0240863 A1* | 10/2005 | Olander et al. | 715/513 |
| 2006/0031750 A1* | 2/2006 | Waldorf et al. | 715/501.1 |
| 2006/0101346 A1* | 5/2006 | Denzlein | 715/762 |
| 2006/0206856 A1 | 9/2006 | Breeden et al. | |
| 2006/0235548 A1* | 10/2006 | Gaudette | 700/83 |
| 2007/0043832 A1* | 2/2007 | Sane | 709/219 |
| 2009/0183141 A1 | 7/2009 | Tai et al. | |

OTHER PUBLICATIONS

Cardone et al., Using XForms to Simplify Web Programming, May 10-14. 2005, ACM International World Wide Web Conference Committee, pp. 215-224.*

Ricca et al., Analysis and Testing of Web Applications, Aug. 7, 2002, ICSE 2001 Proceedings of the 23rd International Conference on Software Engineering, pp. 25-34.*

Cugini et al., VISVIP: 3D Visualization of Paths Through Web Sites, Aug. 6, 2002, Tenth International Workshop on Database and Expert Systems Applications, pp. 259-263 (pp. 1-5 of unnumbered provided copy).*

Saganich Jr. et al., BEA WebLogic Workshop 8.1 Kick Start: Simplifying Java Web Applications and J2EE, Mar. 5, 2004, Sams Publishing, pp. 65-85.*

* cited by examiner

SYSTEM AND METHOD FOR PAGE FLOW EDITOR

CLAIM OF PRIORITY

This application claims benefit from U.S. Provisional Patent Application No. 60/721,148, filed Sep. 27, 2005, entitled "Page Flow Editor" by Thomas A. Cook et al.

CROSS-REFERENCE TO RELATED APPLICATIONS

This application is related to the following co-pending applications which are hereby incorporated by reference in their entirety:

U.S. patent application Ser. No. 11/527,988, entitled SYSTEM AND METHOD FOR ACTION OUTPUT/PAGE INPUT MISMATCH DETECTION AND RESOLUTION, by Thomas A. Cook, et al., filed Sep. 27, 2006.

U.S. patent application Ser. No. 11/527,884, entitled SYSTEM AND METHOD FOR DECLARATIVE VALIDATION RULE EDITOR, by Thomas A. Cook, et al., filed Sep. 27, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of page flow exploration and editing.

BACKGROUND

A page flow is a collection, set or directory of Web application files that work together to implement a user interface (UI) feature. It allows a software developer to separate user interface code from navigational control and other business logic. User interface code can be placed where it belongs (e.g., in JSP files). Navigational control can be implemented easily in a page flow's single controller file, which is the nerve center of (a component of) a Web application. A page controller file is a special Java file that uses an annotation such as @Jpf.Controller. Business logic can be implemented in the page controller file, or in Java controls that are called from controller files. For a non-limiting example, a page flow could implement a Web application's user registration wizard feature. The files of such a page flow could be arranged in an exemplary "userRegistration" directory shown in FIG. 1, which contains several *.jsp files 101, a control file 102. The *.jsp files are standard Java Server Pages (JSP) files that contain markup that describes the visual aspect of the user registration wizard. A Java control file contains annotated Java code that implements logic used by the user registration wizard. The *jpf file contains annotated Java code that implements the navigation and state management logic of the user registration wizard and that makes calls to business logic.

A page flow explorer provides a consistent means of locating and managing all artifacts (components, actions, or files) related to a given page flow via graphical and code-level tools to simplify the development cycle, whether editing the controller files or the member pages. The tree view of the explorer can be presented as a page flow graph (tree) that consolidates functions previously dispersed among the project tree, structure pane, data palette, property sheet, design palette, controls, and action view. The source view of the explorer presents syntax completion, validation, and other programmer's aids reduce the amount of work required to get your application running. Many artifacts are represented by nodes in the page flow graph. While the explorer view of the page flow is useful for doing basic management of the page flow related artifacts, it lacks features necessary to support complete editing of the page flow.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Various embodiments of the present invention enable a three-pane page flow editor optimized for viewing and editing a page flow. It centers around a selected focal node referenced in the page flow editor, shows details and allows editing in the vicinity of the node. It provides a visual representation of nodes and the connections among them, enabling the ability to read and edit connections between nodes in a local area of the page flow without the overlaps between lines and crossovers once the page flow grows complex in real applications. Consequently, user can edit a page flow via dragging and dropping of entities instead of switching back and forth between the two design views, or a design view and source view.

Various embodiments of the present invention provides at least the following capabilities for the page flow editor:

- A clear local picture of inputs and outputs for a given node, uncluttered by irrelevant nodes and links.
- A canned, standardized layout where every link is easy to locate, select, and edit.
- A place to put additional details, such as global forwards raised by an action, that would otherwise unduly clutter the main view.
- A way to dynamically trace paths through the flow using in a sequential frame presentation, similar to time-based media editors.
- A unified context for editing both controller and JSP files.
- A means of quickly navigating to various source artifacts that make up a page flow.
- An integration with source view for a less disjointed overall editing experience.

Figure 1:
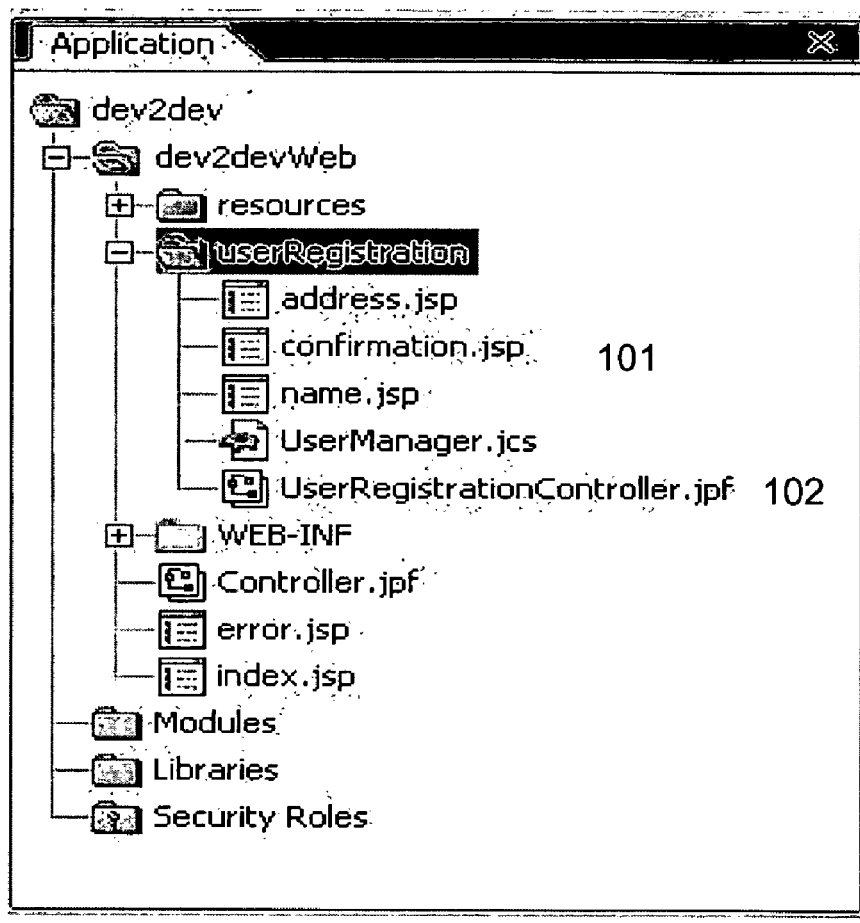
FIG. 1 shows an exemplary page flow implementing a Web application's user registration wizard feature as displayed in a page flow explorer.
Figure 2:
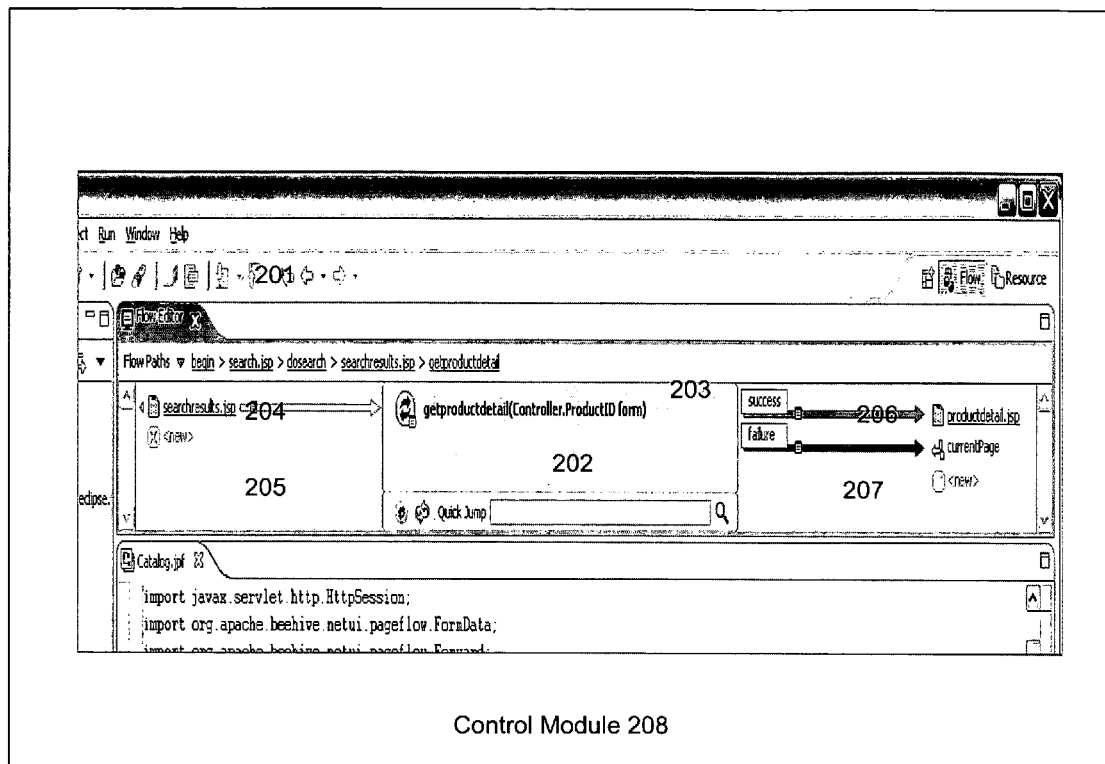
FIG. 2 is an illustration of an exemplary page flow editor in one embodiment of the present invention.

FIG. 2 is an illustration of an exemplary page flow editor in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 2, the central section (pane) 202 of the page flow editor 201 shows details of the focal node 203 and navigation in the flow editor is based on bringing a given node into view in this central section. Initially, the focal node is the begin action when editing a page flow. It is, in essence, the "home" node for a page flow, much like an index or welcome page on a Web site. The upstream 204 and downstream 206 connections (links) and nodes of the focal node in the page flow are shown in the sections to the left 205 and right 207 of the center section, respectively. In addition, the left and right sections provide locations for creating additional links, reconnecting existing links, or deleting existing links upstream or downstream. The entire page flow editor is supported by an independent underlying control module 208 behind this view, which provides navigational control and other business logic to support the page view on top of it.

Figure 3:
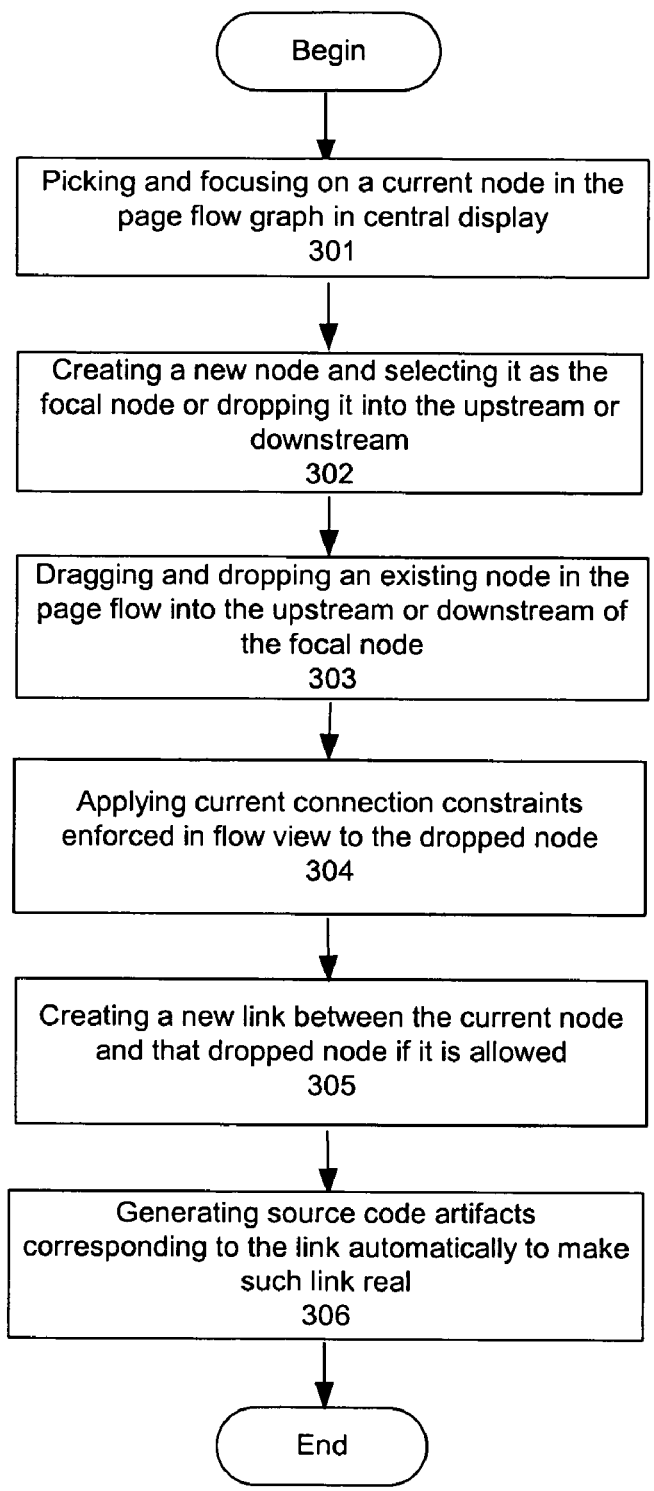
FIG. 3 is a flow chart illustrating an exemplary page flow editing process via in accordance with one embodiment of the invention.

FIG. 3 is a flow chart illustrating an exemplary page flow editing process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 3, a focal node in the page flow graph is picked and focused on in central display at step 301. Optionally, a new node can be created before it is selected as the focal node or dropped into the upstream or downstream section at step 302. An existing node in the page flow can be dragged and dropped into the upstream or downstream of the focal node at step 303, At the time the node is dragged and dropped, and current connection constraints is applied to either allow or disallow the node at step 304. If the drop is allowed, a new link can be created between the focal node and that dropped node at step 305. The constraints apply to existing links only when attempting to change the destination of the link. Dragging the node into the downstream means the dropped node is the destination end of the link, while dragging the node into the upstream means the dropped node is on the source side of the link. Finally, source code artifacts corresponding to the link are generated automatically to make such links real at step 306.

In some embodiments, nodes that are inherently terminal and can only have a single upstream reference, which include but are not limited to, return node, an unspecified (i.e. placeholder) node as discussed later, can never be the focal node; they only appear in the downstream section. An exit node nodes can have multiple upstream nodes, but will never be the focal node. Nodes that are inherently terminal but support more than one upstream reference—such as a shared flow action, external page flow, or external page—are allowed as focal nodes since this is the only way to easily see all the nodes that refer to them.

In some embodiments, a user can move upstream or downstream in the page flow following path through the graph by clicking the link portion of an upstream or downstream node. The clicked node then becomes the new focal node and is displayed in the central section. A user can also jump to other nodes in the page flow by specifying the name of the node to jump to, or dragging a node from the page flow tree and dropping it into the central section. If the node selected here is another "external" or "nested" page flow, a context menu can be used to jump to a page flow editor for that page flow.

In some embodiments, a user can reattach a link via a context menu on the link itself, or by dragging and dropping of the new destination node onto the existing destination node. An existing link to the focal node can also be deleted in the similar manner. The node in the upstream or downstream section, however, should be removed from view since it no longer has an association with the focal node.

In some embodiments, the page flow editor supports the displaying of source code and/or the annotation metadata of the corresponding artifacts (nodes), wherein the artifacts and the links to the nodes in the page flow view is automatically updated to be in sync with any change made in the source code.

In some embodiments, several artifacts can be registered with the page flow if they are dragged from the project tree, although most drags onto the page flow editor originate from the page flow explorer. Such artifacts include but are not limited to, external pages, html files, plain text files, other existing page flows, controls, shared flow and message bundles.

Figure 4:
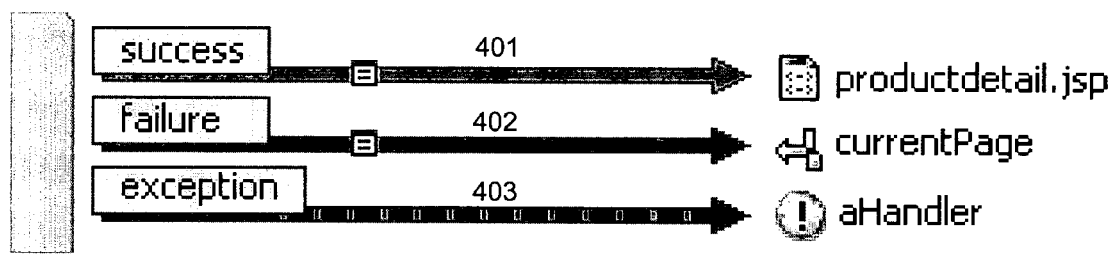
FIG. 4 is an illustration of different types of links in a page flow editor in one embodiment of the present invention.

In some embodiments, the page flow editor makes distinction among different link types, showing different representations of forwards (success) 401, validation error forwards (failure) 402, and catches (exception forwards) 403 as shown in FIG. 4. The states of the links such rollover and selection states can be associated with the corresponding links.

Figure 5:
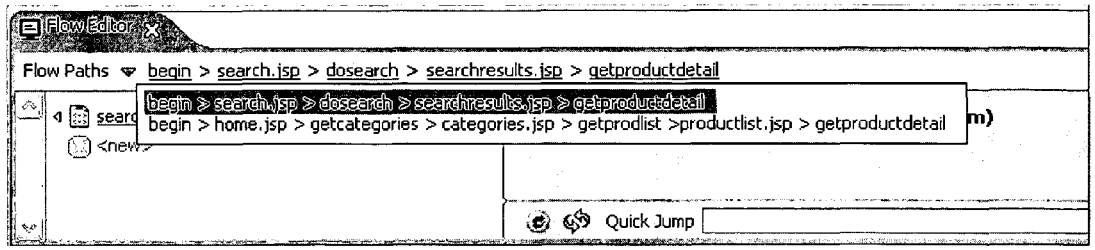
FIG. 5 (a)-(b) is an illustration of an exemplary flow path graph in one embodiment of the present invention.
Figure 5:
Figure 5:
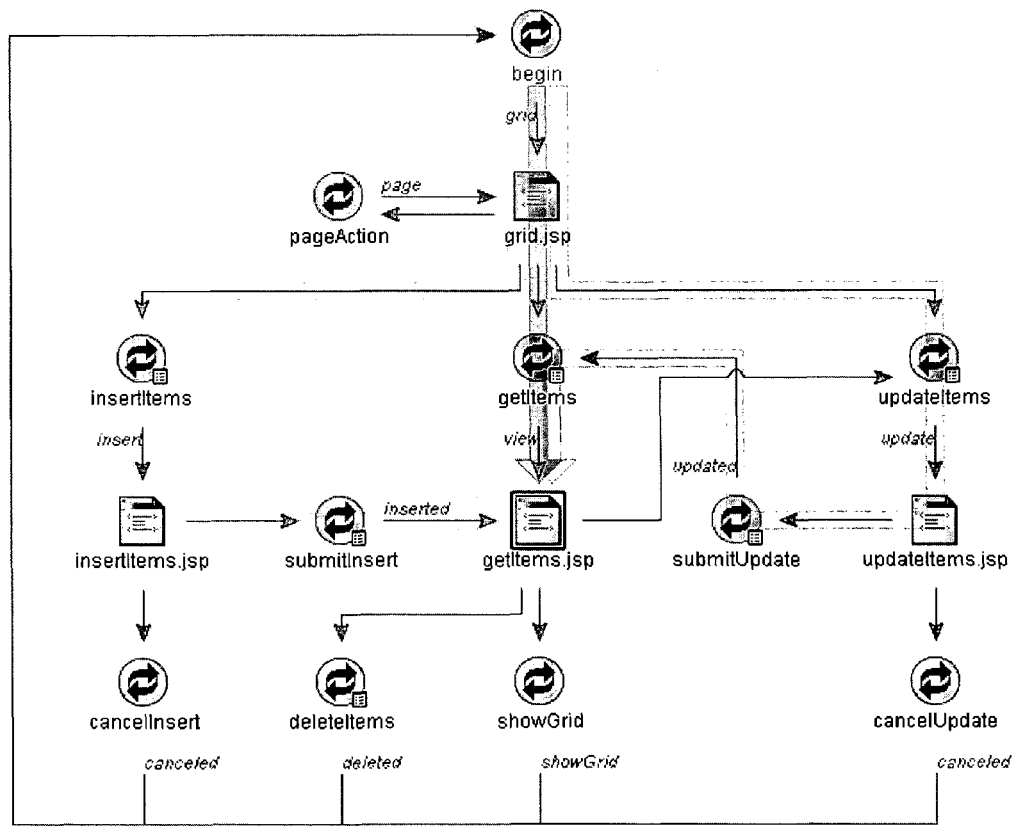

In some embodiments, the page flow editor also supports a flow path section of the editor, which displays the path(s) from the begin node (action) in the page flow (when the focal node can be traced upstream to the begin node) to provide additional context around the focal node as shown in FIG. 5 (a)-(b). It also provides a quick means of navigating upstream by allowing the user to select which path to display. The selected path is then rendered as a set of links. The flow path selector is also useful in that it can indicate cycles in the flow graph, which can't always be easily identified in the three pane editor itself.

In some embodiments, the page flow editor also supports a plurality of node types as listed below:

Return Nodes. These nodes reflect the NavigateTo attribute on an annotation, providing for symbolic navigation.

Exit Nodes. These nodes reflect the returnAction attribute on an annotation in a nested page flow. It designates the action to be raised in a nesting page flow upon a particular completion path of the nested flow.

Unspecified Nodes. These nodes reflect an empty path attribute on an annotation. These nodes serve as placeholders until a concrete note can be selected to replace it in the editor.

In some embodiments, the page flow editor supports refactoring across multiple languages, which can include one or more of programming languages and a markup languages, and files. Once a node in the page flow is renamed, the underlying model of the page flow editor will fix references to the node across files and languages in the page flow so that every reference to the node is in sync. Such cross file and platform refactoring is performed transparent to the page flow display and the user.

Seeing the Big Picture

Figure 6:
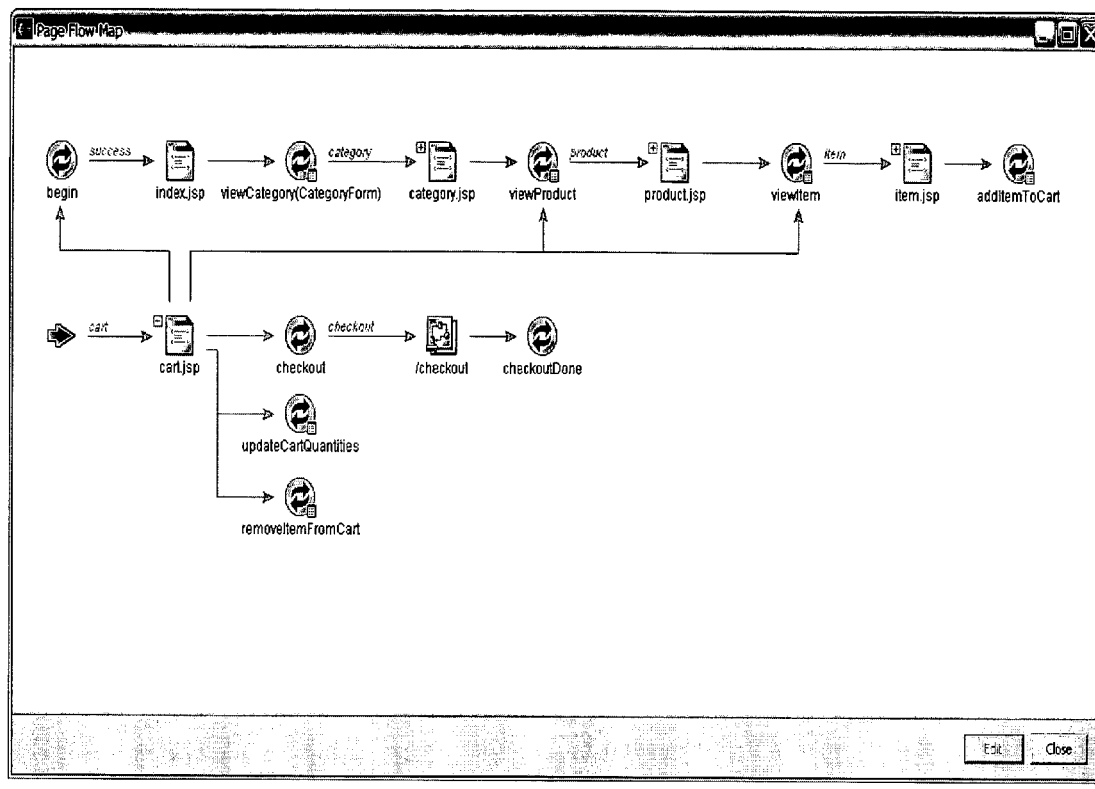
FIG. 6 is an illustration of an exemplary overview of a page flow in one embodiment of the present invention.

In some embodiments, the page flow overview provides the ability to view the overall structure of a given page flow being edited as a reference, in much the way that a site maps helps orient users to the overall structure and content of a Web site, so that a user can view the microcosm of the focal node in its broader context as shown in FIG. 6. The overview is an automatically laid out read-only view of the entire flow that enables a user to clearly see all links and easily discern their source and destination nodes (though some of this information may be presented dynamically, based on user manipulation, rather than continuously). It can also be used as a selection mechanism for setting a node selected from the overview as the focal node in the page flow editor.

The goal for the page flow overview is to automatically layout a rendering of the page flow structure that requires very little manipulation on the part of users in order to be readable. It provides user with the big picture as how to get to a certain point in the page flow via different possible paths. The principal paths through the flow can be identified and each of them plotted on a single, separate horizontal line.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "module" is used in the embodiments of the systems and methods described above, it will be evident that such concept can be interchangeably used with equivalent concepts such as, class, method, type, interface, bean, component, object model, and other suitable concepts. While the concept "artifact" is used in the embodiments of the systems and methods described above, it will be evident that such concept can be interchangeably used with equivalent concepts such as, class, method, type, interface, bean, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to support editing of a page flow that represents an user interface (UI) of a web application, wherein the page flow comprises a plurality of nodes and a plurality of links among the plurality of nodes, and each node of the plurality of nodes represents one or more artifacts related to the page flow, the page flow editor comprising:
   one or more processors;
   a central section showing details of a focal node in the page flow;
   a left section showing one or more of immediate upstream connections of the focal node in the page flow; and
   a right section showing one or more of immediate downstream connections of the focal node in the page flow, and
   wherein the page flow editor, running on the one or more processors, operates to perform
      allowing a user to select a first node in the page flow as a focal node and focusing on the focal node in a display in the page flow editor;
      allowing a user to drag a second node from the page flow and drop the second node in to the central section to create a new link between the focal node and the second node;
      displaying, in the page flow editor, a plurality of flow paths to provide additional context around the focal node, wherein each said flow path includes one or more links of the plurality of links from a begin node to the focal node in the page flow, wherein at least one said flow path includes the second node and the new link;
      allowing the user to select a flow path from the plurality of flow paths; and
      rendering the selected flow path from the plurality of flow paths.

2. The system according to claim 1, wherein:
   the page flow is a graph or a tree.

3. The system according to claim 1, wherein:
   the artifact is one of: an external page, a html file, a plain text file, another existing page flow, a control, a shared flow and a message bundle.

4. The system according to claim 1, wherein:
   the type of each of the plurality of links is one of: forward, validation error forward, and catch.

5. The system according to claim 1, wherein:
   the page flow editor is operable to support displaying and updating of source codes and/or metadata annotations of the plurality of nodes and links in the page flow.

6. The system according to claim 1, wherein:
   the page flow editor is operable to support refactoring across a plurality of programming and markup languages and files.

7. The system according to claim 1, wherein:
   the page flow editor is operable to support at least one of:
      an overview of the page flow being edited; and
      generating and displaying routes of links between nodes in an overview of the page flow.

8. The system according to claim 1, further comprising:
   a control module operable to support displaying, navigating, and editing of the page flow via the page flow editor.

9. The system according to claim 1, further comprising:
the second node includes a nested page flow, and wherein a context menu can be used to jump from the page flow to the nested page flow.

10. A method to support page flow editing, comprising:
allowing an user interface (UI) of a web application to be represented as a page flow in a page flow editor, wherein the page flow comprises a plurality of nodes and a plurality of links among the plurality of nodes, wherein each node of the plurality of nodes represents one or more artifacts related to the page flow;
providing in the page flow editor
    a central section showing details of a focal node in the page flow,
    a left section showing one or more of immediate upstream connections of the focal node in the page flow, and
    a right section showing one or more of immediate downstream connections of the focal node in the page flow;
allowing a user to select a first node in the page flow as a focal node and focusing on the focal node in a display in the page flow editor;
allowing a user to drag a second node from the page flow and drop the second node in to the central section to create a new link between the focal node and the second node;
displaying, in the page flow editor, a plurality of flow paths to provide additional context around the focal node, wherein each said flow path includes one or more links of the plurality of links from a begin node to the focal node in the page flow, wherein at least one said flow path includes the second node and the new link;
allowing the user to select a flow path from the plurality of flow paths; and
rendering the selected flow path from the plurality of flow paths.

11. The method according to claim 10, further comprising:
selecting a node as a new focal node via at least one of:
    navigating to and selecting a node in the upstream or downstream of the focal node;
    specifying name of the node to jump to; and
    dragging and dropping the node from the page flow.

12. The method according to claim 10, further comprising:
deleting or reattaching a link to the focal node.

13. The method according to claim 10, further comprising:
displaying and updating source codes and/or metadata annotations of the plurality of nodes and links.

14. The method according to claim 10, further comprising:
supporting refactoring across a plurality of programming languages and files.

15. The method according to claim 10, further comprising:
selecting a node from an overview as the focal node.

16. The method according to claim 10, further comprising:
generating and displaying routes of links between nodes in the overview of the page flow.

17. The method according to claim 10, further comprising:
applying connection constraints in the page flow to the second node; and
generating source codes corresponding to the new link automatically.

18. The method according to claim 10, further comprising:
indicating a cycle to an user in a flow path.

19. A non-transitory machine readable medium having instructions stored thereon that when executed cause a system to:
allow an user interface (UI) of a web application to be represented as a page flow in a page flow editor, wherein the page flow comprises a plurality of nodes and a plurality of links among the plurality of nodes, wherein each node of the plurality of nodes represents one or more artifacts related to the page flow;
provide in the page flow editor
    a central section showing details of a focal node in the page flow,
    a left section showing one or more of immediate upstream connections of the focal node in the page flow, and
    a right section showing one or more of immediate downstream connections of the focal node in the page flow;
allow a user to select a first node in the page flow as a focal node and focusing on the focal node in a display in the page flow editor;
allow a user to drag a second node from the page flow and drop the second node in to the central section to create a new link between the focal node and the second node;
display, in the page flow editor, a plurality of flow paths to provide additional context around the focal node, wherein each said flow path includes one or more links of the plurality of links from a begin node to the focal node in the page flow, wherein at least one said flow path includes the second node and the new link;
allow the user to select a flow path from the plurality of flow paths; and
render the selected flow path from the plurality of flow paths.

* * * * *

UNITED STATES PATENT AND TRADEMARK OFFICE
CERTIFICATE OF CORRECTION

| | | |
|---|---|---|
| PATENT NO. | : 8,078,954 B2 | Page 1 of 1 |
| APPLICATION NO. | : 11/528062 | |
| DATED | : December 13, 2011 | |
| INVENTOR(S) | : Cook et al. | |

It is certified that error appears in the above-identified patent and that said Letters Patent is hereby corrected as shown below:

In column 1, line 62, delete "*jpf" and insert -- *.jpf --, therefor.

Signed and Sealed this
Sixth Day of March, 2012

David J. Kappos
*Director of the United States Patent and Trademark Office*